(12) United States Patent
Ito

(10) Patent No.: US 9,361,553 B1
(45) Date of Patent: Jun. 7, 2016

(54) STRUCTURAL INTEGRITY WHEN 3D-PRINTING OBJECTS

(71) Applicant: ADOBE SYSTEMS INCORPORATED, San Jose, CA (US)

(72) Inventor: Daichi Ito, Los Gatos, CA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 0 days.

(21) Appl. No.: 14/669,851

(22) Filed: Mar. 26, 2015

(51) Int. Cl.
*G06F 3/12* (2006.01)
*G06K 15/02* (2006.01)
*G06F 19/00* (2011.01)

(52) U.S. Cl.
CPC ...................................... *G06K 15/18* (2013.01)

(58) Field of Classification Search
CPC ....... G06F 17/50; G06F 19/50; C23C 16/513; C23C 26/02; B28B 1/001; B33Y 50/02
USPC ........ 358/0.1, 1.9, 1.13, 1.15, 3.2, 3.29, 3.32, 358/1.18; 345/419, 664; 700/97, 98, 117, 700/118, 119, 20, 180, 182; 703/1
See application file for complete search history.

(56) References Cited

U.S. PATENT DOCUMENTS

| 8,175,734 | B2* | 5/2012 | Fogel | G06F 17/50 700/119 |
| 2008/0246757 | A1* | 10/2008 | Ito | G06T 15/10 314/419 |
| 2011/0222081 | A1* | 9/2011 | Yi | G06T 17/00 358/1.9 |
| 2015/0042017 | A1* | 2/2015 | Ramaswamy | C23C 16/513 264/446 |
| 2016/0039194 | A1* | 2/2016 | Cable | B32B 38/0004 428/195.1 |

* cited by examiner

*Primary Examiner* — Gabriel Garcia
(74) *Attorney, Agent, or Firm* — Shook, Hardy & Bacon, L.L.P.

(57) ABSTRACT

In various implementations, a computing device is configured to reconstruct a 3D model, such that reconstruction of the 3D model prevents the printing of long lines typically associated with cracking, bending, or decreased structural integrity of a 3D printed object based on the 3D model. In some implementations, a sliced 3D model is analyzed to determine that a structural characteristic of the 3D model is compatible for reconstruction. The 3D model is then reconstructed based on the determination that the 3D model is compatible. Other implementations analyze the 3D model to determine whether at least a portion of the 3D model shell has a seamless body. In this regard, the 3D model is reconstructed based on determining that the shell portion has a seamless body.

20 Claims, 7 Drawing Sheets

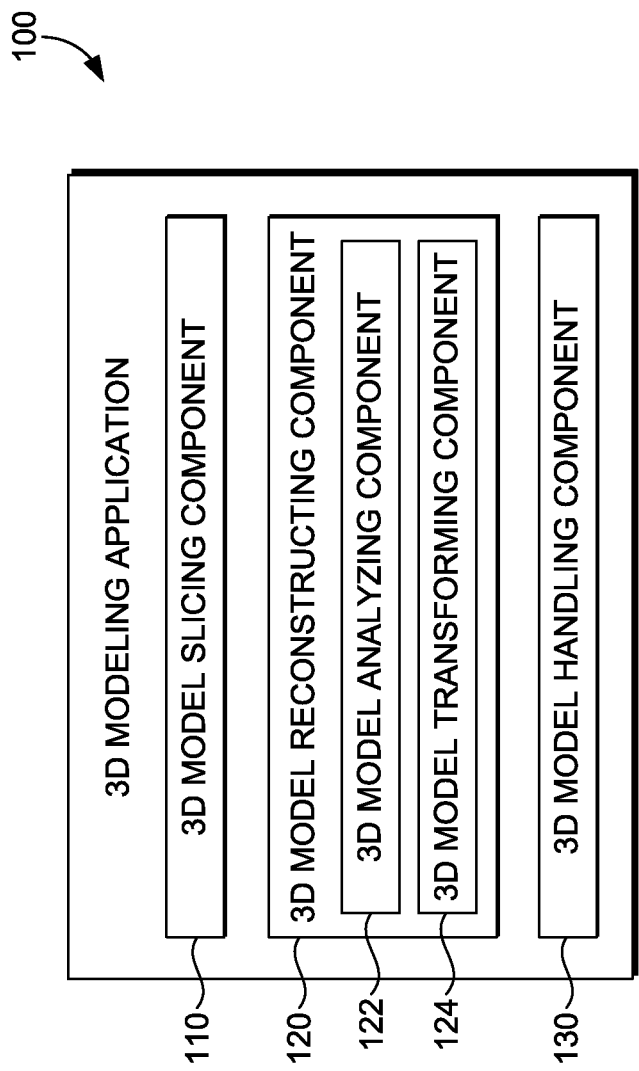

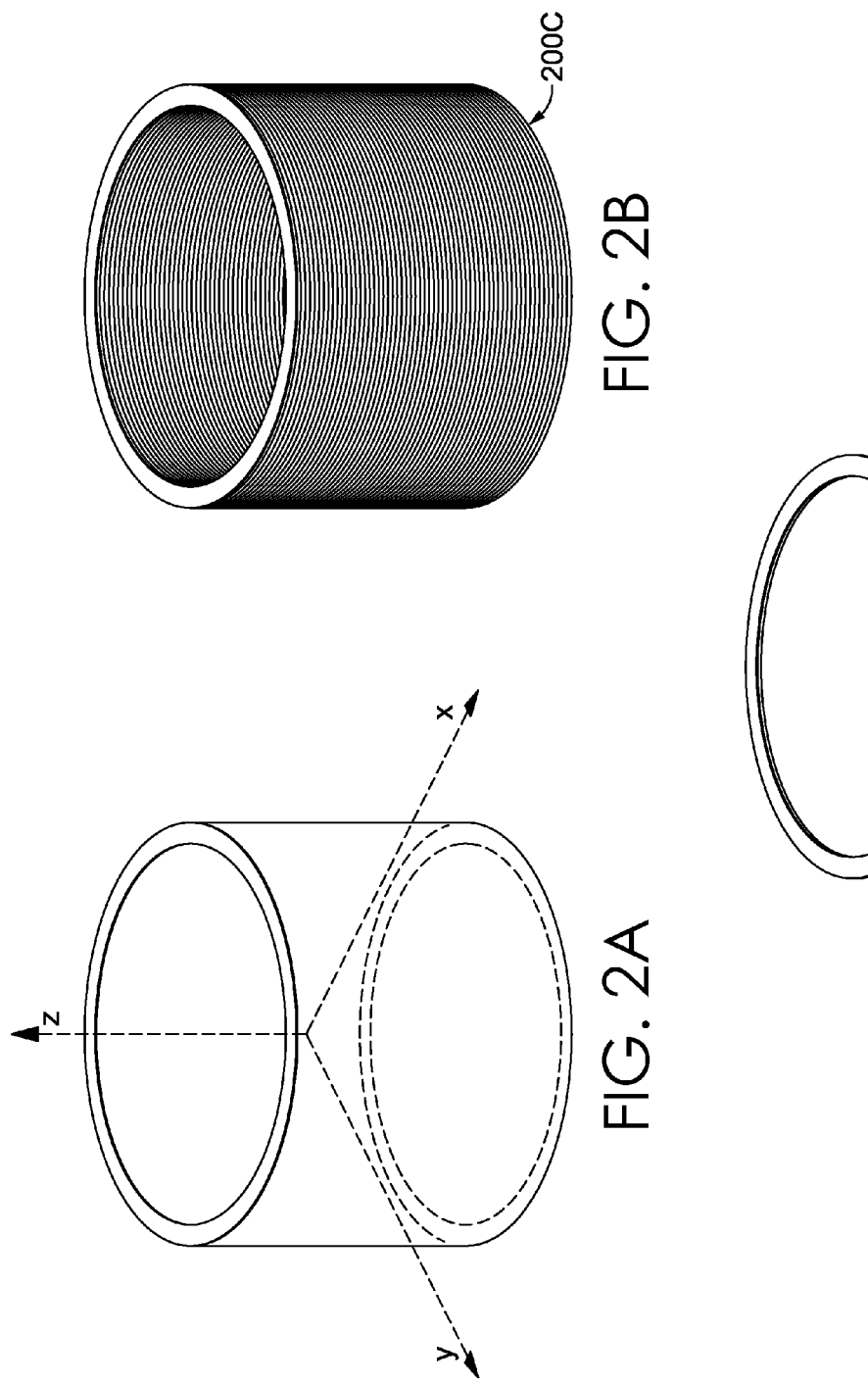

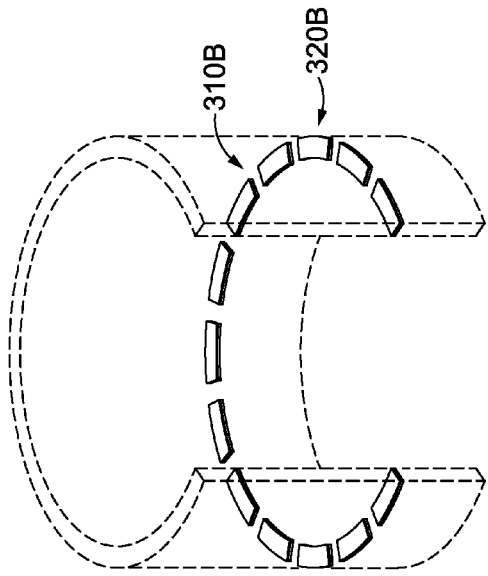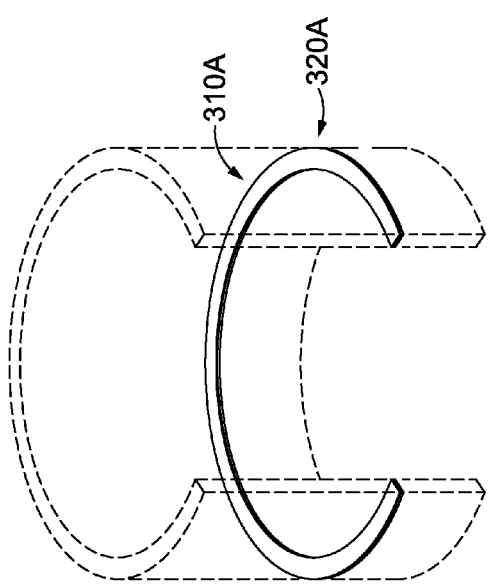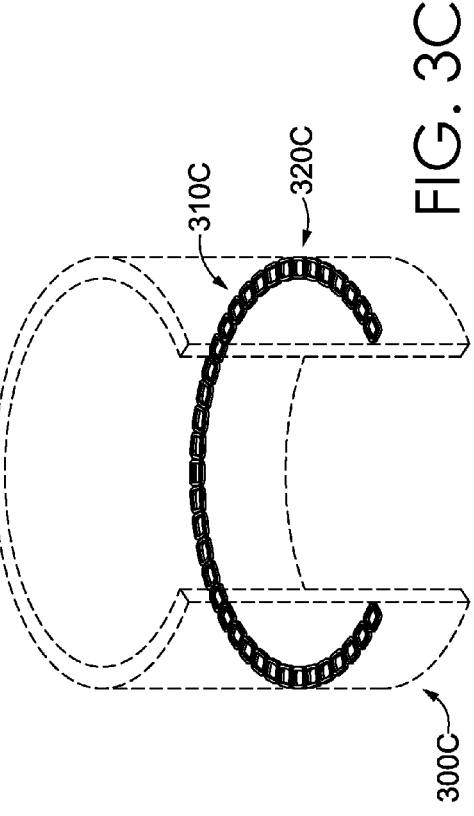

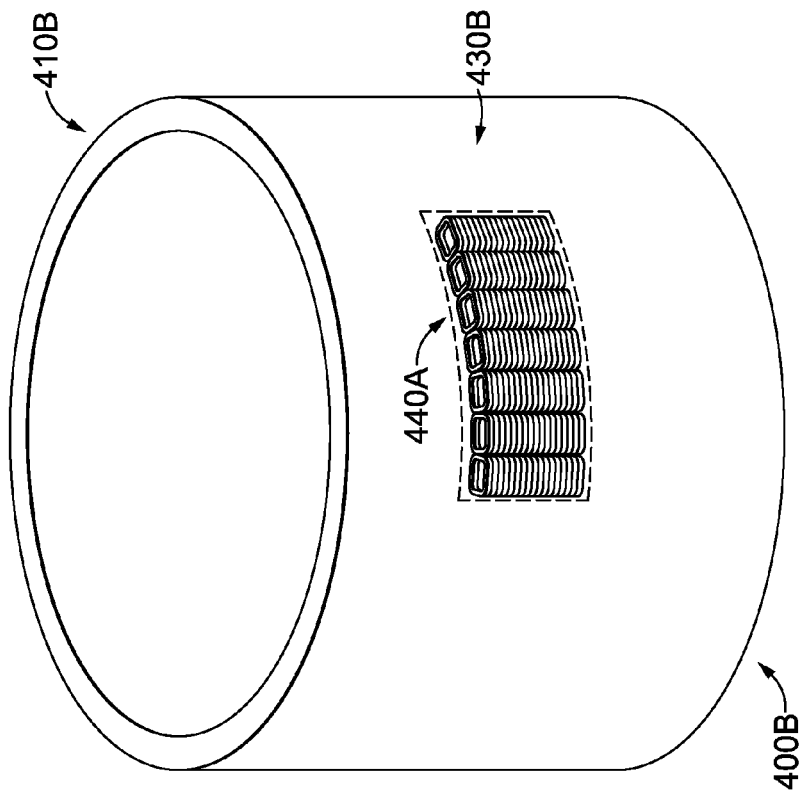
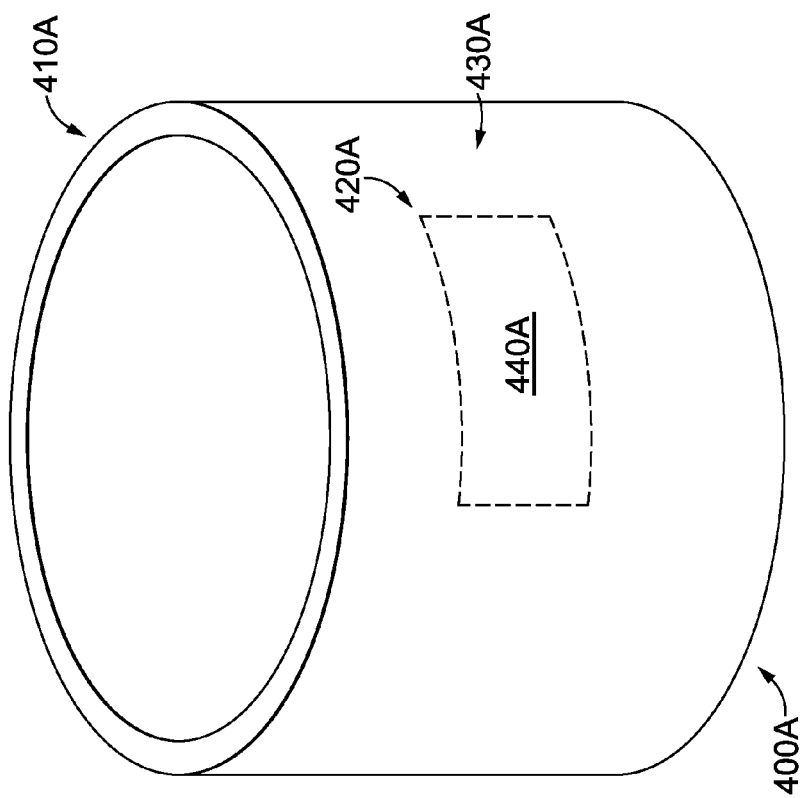

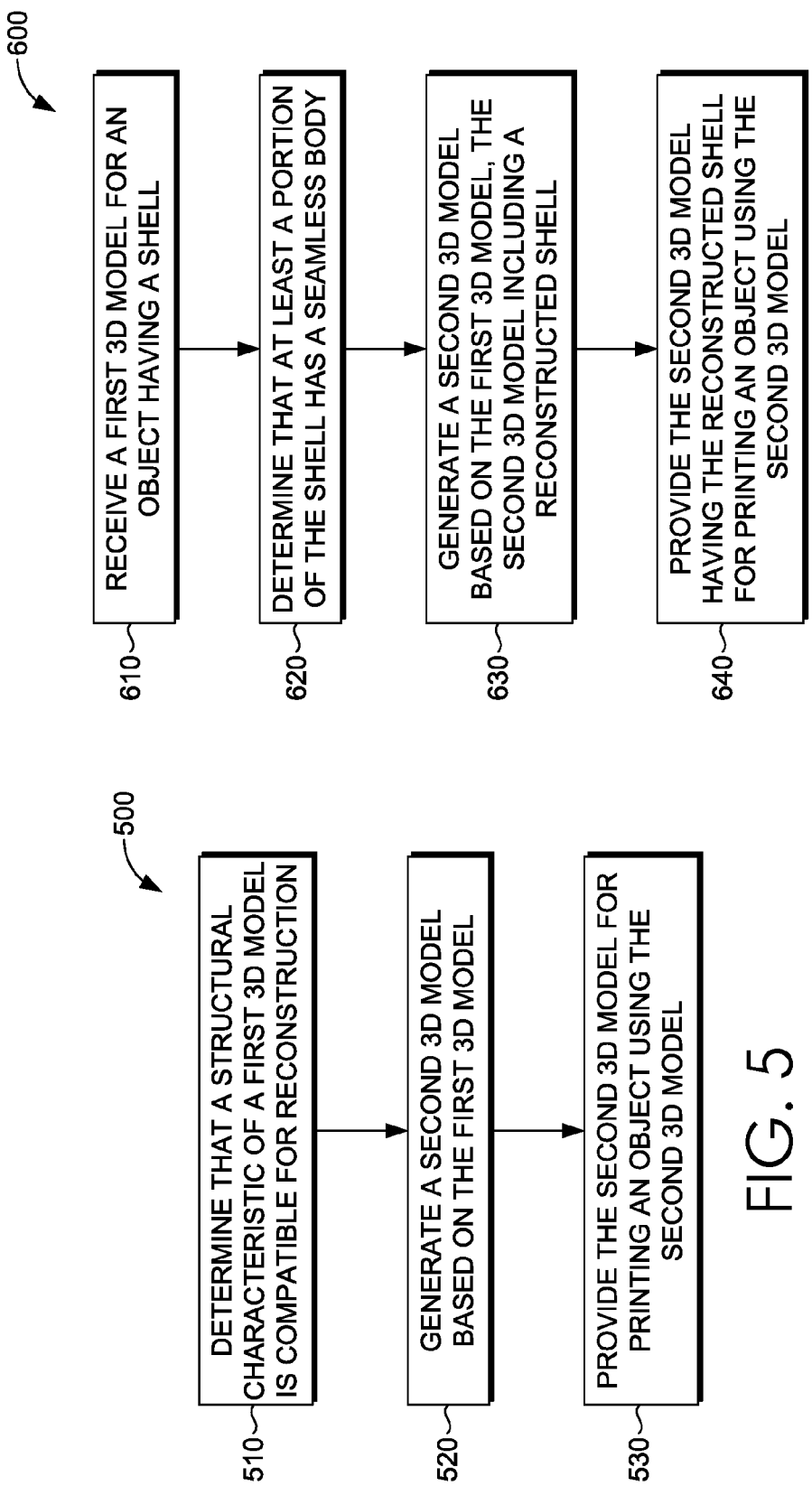

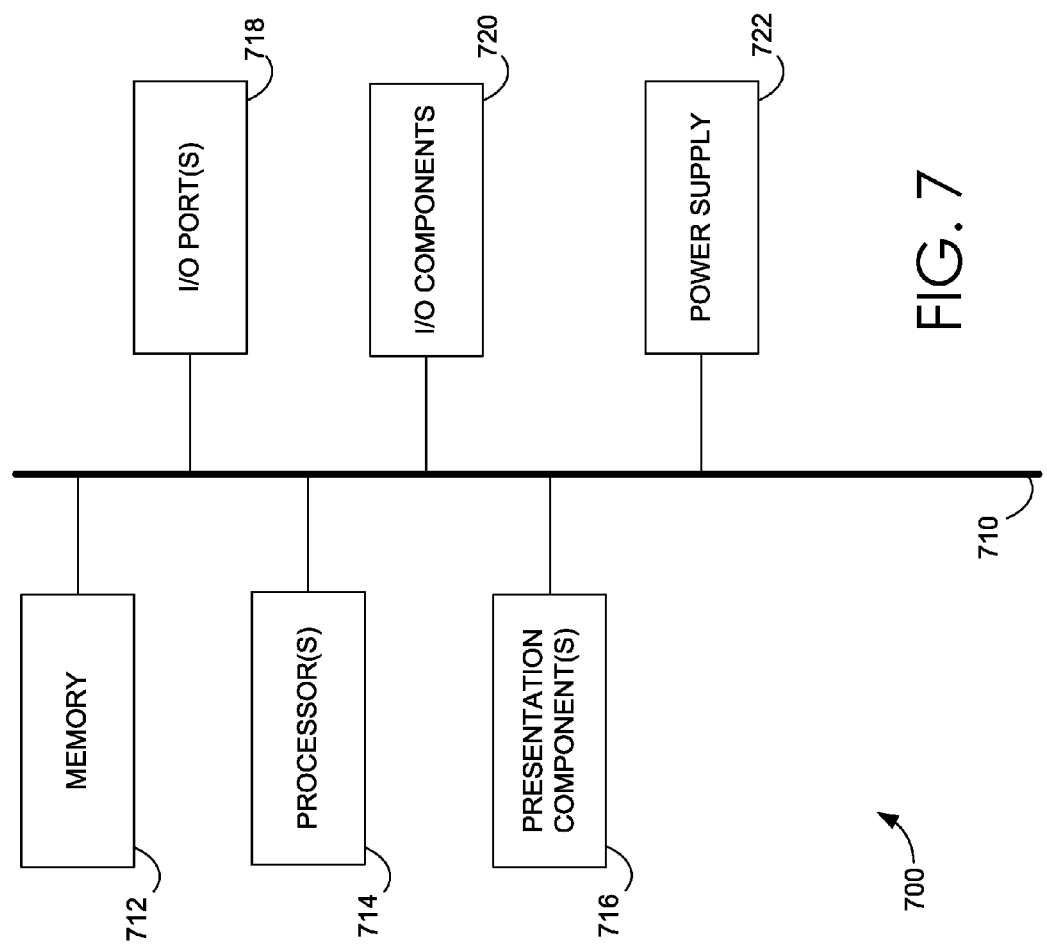

STRUCTURAL INTEGRITY WHEN 3D-PRINTING OBJECTS

BACKGROUND

Consumer-grade 3D printers are becoming commonplace in households and businesses for printing tangible objects. 3D modeling programs, including some advanced graphic programs such as Adobe® Photoshop®, can be employed to either create a 3D model from scratch, view and manipulate a 3D model, or in some cases, generate a 3D model from a scanned input. The 3D model is a virtual design for a particular object and is typically provided in a digital file. When a 3D model is ready for fabrication, the 3D model can be printed by a 3D printer to create a tangible replica of the 3D model.

Consumer-grade 3D printers employ a cost-effective method of manufacturing called fused deposition modeling. Fused deposition modeling relies on an additive principle of melting and laying down a fast-cooling thermoplastic material, typically in filament form, into layers. Most consumer-grade 3D printers that employ fused deposition modeling processes rely on the 3D modeling program to cut the 3D model into many horizontal cross-sections, herein also referred to as slices. These slices can then be interpreted by the 3D printer to print the slices upon one another until the desired object is formed. The printing of each slice can be analogized with the printing of a 2D image using an inkjet printer. In more detail, a standard inkjet printer can print a 2D image by laying ink onto paper, line-by-line, until each line is laid on the paper to create the desired image. Similarly, consumer-grade 3D printers can print each slice as a 2D image by melting and laying the thermoplastic material onto a first surface or preceding slice, line-by-line, until each line is laid to create the desired slice.

As consumer-grade 3D printers are becoming larger, so are the objects being printed. While fused deposition modeling is a well-refined methodology for printing smaller objects, the printing of larger objects can lead to problems with structural integrity and material waste. More specifically, the printing of larger objects introduces issues involving the bending and cracking of thermoplastic material when long lines are printed. When a melted thermoplastic material is printed, the material will contract as it cools. When a long line is printed using a single pass of the 3D printer, the cooling and contraction time along the length of the line is directly proportional to the length of the line. As such, the longer the printed line, the greater the likelihood of bending and cracking. A similar problem occurs when printing long lines on top of one another. For instance, an earlier printed line could cool and contract far before a newly printed line, sitting atop the earlier printed line, begins to cool. As a result, the earlier printed line's contraction can cause further bending or cracking in the structure.

Several solutions have been contemplated to avoid bending and cracking when 3D printing a large object. A first contemplated solution is to print the object as a solid. Concerns of bending and cracking can be minimized as each printed line has more bonds across its surface area due to adjacency with a plurality of printed lines. The process of printing solid objects is inefficient, however, as most objects are printed hollow to reduce print times and material waste. Other solutions have employed support structures, including lattices interior to a shell portion, or employing "rafts" to support a bottom portion. Some support structures (i.e., rafts) can be wasteful, however, and can also take away from the pleasing aesthetics of a 3D printed object.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention are directed to preventing cooling fractures and improving structural integrity when 3D printing an object based on a 3D model. In particular, a 3D model is reconstructed in such a way that the printing of long lines, which is associated with cracking, bending, or decreased structural integrity of a 3D printed object based on the 3D model, is avoided. A 3D model, as one of ordinary skill in the art may appreciate, is a virtual representation of an object based on a set of predefined parameters (e.g., shape, length, width, height, etc.). As such, a 3D model includes a plurality of design parameters therewith for defining its geometric characteristics. As will be used herein, a "3D model" can be used to refer to a constructed 3D model (i.e., a 3D model object in a CAD file), or as a set of design parameters that define a 3D model to be generated by, for instance, a 3D modeling application. For example, a 3D model can be an object in a CAD file, the object being a 3D model of a cylinder having a radius of 2 cm and a height of 20 cm. In another example, a 3D model can be a set of design parameters including, for instance: (bottom shape=circle; profile shape=cylinder; top shape=circle; angle=90 degrees; height=10 cm; radius=2 cm), the set of design parameters for constructing the same cylinder from the aforementioned example.

In this regard, the term "reconstructed" is broadly used to describe a scenario including one of: receiving a first 3D model based on a set of design parameters and generating a new second 3D model based on a new set of design parameters; receiving a first 3D model based on a set of design parameters and modifying the first 3D model with a new set of design parameters; or receiving a first set of design parameters and constructing a 3D model using a new set of design parameters based on the first set of design parameters.

In accordance with aspects of the present disclosure, a structural characteristic of a first 3D model is determined to be compatible for reconstruction. In other words, the structural characteristic is determined to be a single printable portion (i.e., a solid line having a length exceeding a threshold length) at a first location of a first slice of the first 3D model. Based on the first 3D model, a second 3D model is generated including a second slice corresponding to the first slice. The second slice has, at a second location corresponding to the first location, a plurality of independently printable portions. The reconstruction ensures that each of the independently printable portions of the second slice is shorter than the single printable portion of the corresponding first slice. In this way, each of the independently printable portions has a length that does not exceed the threshold length. The second 3D model, having the plurality of independently printable portions, can then be provided for printing an object using the second 3D model. In accordance with embodiments described herein, printing of the object based on the 3D model can be performed using fused deposition modeling and utilizing a thermoplastic material.

In some embodiments described herein, the 3D model can be reconstructed prior slicing the 3D model, such that the 3D model can be printed immediately upon slicing, and the printing of long lines is prevented due to the reconstruction. In accordance with some aspects of the present disclosure, a first 3D model for an object having an original shell is received. The original shell defines the original shape (e.g., the walls) of the object. A determination is made that at least a portion of the original shell, at a first location, has a seamless body. A seamless body can be a portion of a 3D printed object having one or more solid lines. Based on the first 3D model, a second 3D model can be generated having a reconstructed shell having a plurality of columnar structures at a second location corresponding to the first location. The reconstructed shell defines a shape that is substantially similar to the original shape of the object. The second 3D model, having the reconstructed shell, can then be provided for printing the object using the second 3D model.

BRIEF DESCRIPTION OF THE DRAWINGS

The present invention is described in detail below with reference to the attached drawing figures, wherein:

FIG. 1 is a block diagram of an exemplary 3D modeling application for reconstructing 3D models, in accordance with embodiments described herein;

FIG. 2A is an exemplary 3D model, in accordance with embodiments described herein;

FIG. 2B is an exemplary sliced 3D model, particularly the 3D model of FIG. 2A, in accordance with embodiments described herein;

FIG. 2C is an exemplary slice of the sliced 3D model, particularly the sliced 3D model of FIG. 2B, in accordance with embodiments described herein;

FIG. 3A is an exemplary slice of a sliced 3D model, in accordance with embodiments described herein;

FIG. 3B is an exemplary reconstructed slice, particularly a reconstruction of the slice of FIG. 3A, in accordance with embodiments described herein;

FIG. 3C is another exemplary reconstructed slice, particularly a reconstruction of the slice of FIG. 3A, in accordance with embodiments described herein;

FIG. 4A is an exemplary unsliced 3D model, particularly illustrating a seamless portion of the unsliced 3D model, in accordance with embodiments described herein;

FIG. 4B is an exemplary reconstructed 3D model, particularly a reconstruction of the 3D model of FIG. 4A, in accordance with embodiments described herein;

FIG. 5 is a flow diagram showing an exemplary method for reconstructing a first 3D model in accordance with embodiments described herein;

FIG. 6 is a flow diagram showing an exemplary method for reconstructing a first 3D model in accordance with embodiments described herein; and FIG. 7 is a block diagram of an exemplary computing device in which embodiments of the invention may be employed.

DETAILED DESCRIPTION

Figure 4C:
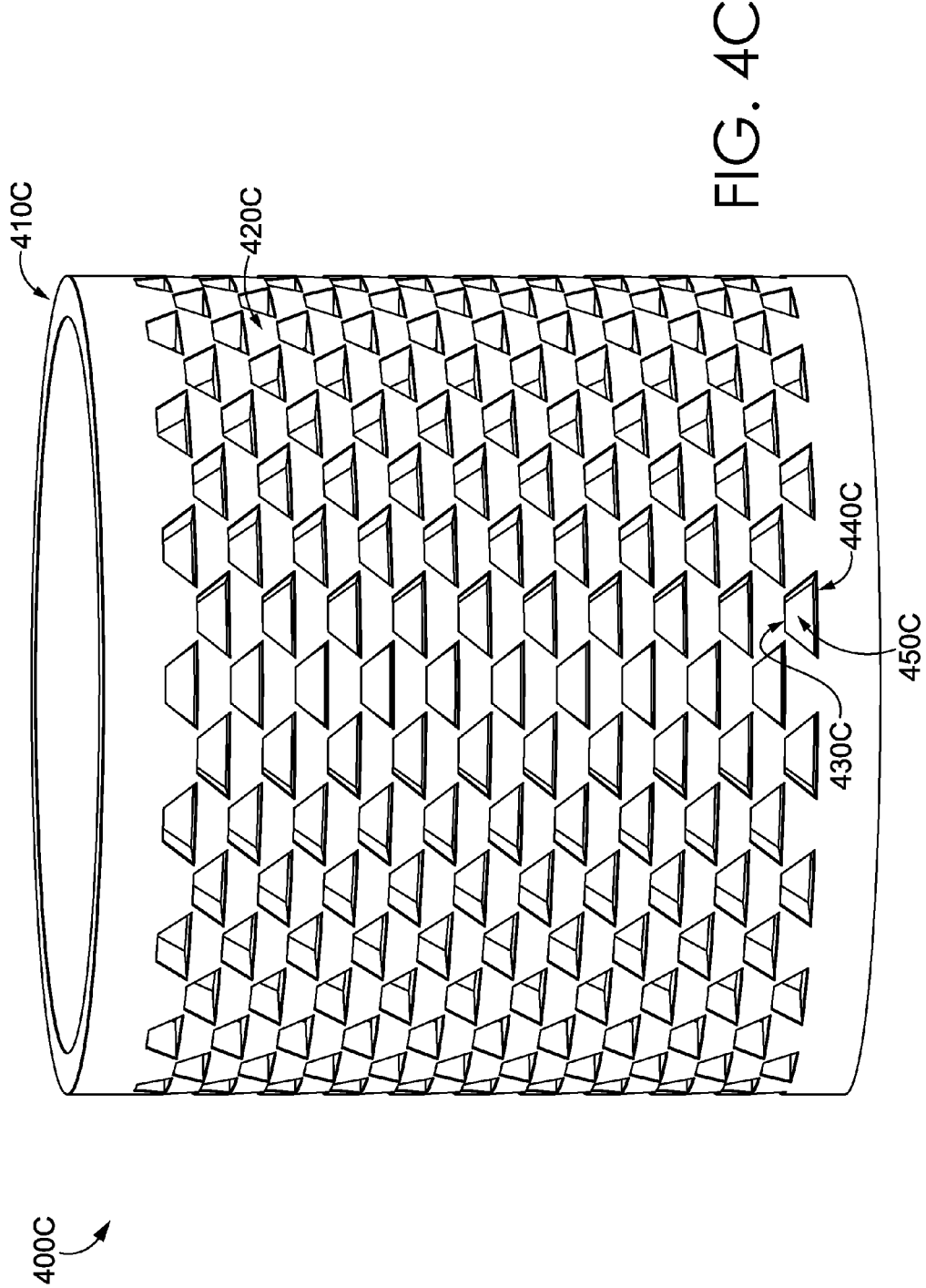
FIG. 4C is an exemplary reconstructed 3D model, particularly illustrating a plurality of offset apertures, in accordance with embodiments described herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Consumer-based three-dimensional ("3D") printers typically use an additive manufacturing process called "fused deposition modeling," or "FDM" for short. As one of ordinary skill in the art can appreciate, FDM 3D printing typically utilizes a fast-cooling thermoplastic material that is melted, extruded or "laid" in successive layers according to a specification or design. As used herein, any references to printing an object is used in reference to 3D printing using the FDM manufacturing process. When FDM 3D printers receive instructions for printing an object, the instructions typically provide the 3D printer with many individual cross sections or "slices" of the object to print, layer by layer, until the object is formed. The printing of each slice is performed by conducting a plurality of passes by the printer head. Comparable to the process of printing a two-dimensional ("2D") image on an inkjet printer, the FDM 3D printer head extrudes melted thermoplastic material, line by line, to form a single slice of the object. The slices are successively printed from bottom to top.

The materials used for additive FDM 3D printing typically include, among other materials, fast-cooling thermoplastics such as acrylonitrile butadiene styrene (ABS) plastics or polylactic acid (PLA) plastics. As previously described, these fast-cooling thermoplastics are melted and extruded through the 3D printer head to print successive layers or "slices" of the object.

In order to reduce material waste, objects are typically 3D printed as hollow objects. To this end, only the walls or the "shell" of the object is printed. The printing of each slice may necessitate the printing of a long, solid line, to construct at least a portion of the shell of the slice. The printing of solid lines requires the 3D printer head to extrude the melted thermoplastic material over a specified distance in a single, unbroken pass. Depending on the characteristics of the thermoplastic, the time at which each portion of a recently printed solid line will cool until solidification will vary, depending on its respective extrusion time. As one of ordinary skill in the art may appreciate, a melted thermoplastic will naturally contract during cooling and solidification. In this regard, the printing of a first portion of a line can lead to a cooling and solidification time that ends sooner than the printing of a latter portion of the same line.

Large deviations in cooling and solidifying times occurring along the length of a single solid line can lead to bending and distortion. Such bending and distortion is expected as an earlier portion cools and contracts, while a latter portion remains melted and malleable. Similarly, if the printer head is relatively fast enough to print an entire first line, such that the cooling and solidifying time of the entire first line is mostly evenly distributed along the length of the line, a failure in structural integrity may also occur when printing another successively layered line atop the first line. As a first line begins to cool, the successively layered line can still be melted and malleable. As such, when both lines have large differences in their cooling timelines, the bond between the lines can distort or even crack as they cool and/or solidify at different times.

To reduce cracking or bending when 3D printing objects, others have sought to redesign the 3D models to include structural supports there within, prior to 3D printing the object based on the 3D model. For instance, one might add several support lattices to a hollow portion of a cylindrically-shaped 3D model. The support lattices can be added to the 3D model, to add structural support when printing successive layers, and to further hold printed lines in place as they are cooling and solidifying. As one of ordinary skill in the art might appreciate, a recently printed line of thermoplastic material bonded to more structures (i.e., a support lattice bonded to a side) than just a lower and upper structure, is apt to have a smaller likelihood of structural failure. In this regard, to avoid the problem of bending or cracking lines, the practice of 3D printing hollow objects can be skirted altogether. A method of printing solid objects can somewhat decrease incidence of structural failure when compared to printing hollow objects. However, 3D printing solid objects is generally still an ineffective method of improving structural integrity. In embodiments described herein, cooling fractures, distortions, and/or other failures in structural integrity when 3D printing an object based on a 3D model can be significantly reduced. To this end, the present invention is directed to reconstructing the 3D model before printing an object based on the 3D model. More particularly, the 3D model is reconstructed in such a manner that the printing of long lines typically associated with structural failures is entirely eliminated. In some aspects, reconstruction of the 3D model can be conducted prior to slicing the 3D model for printing. As will be described, the 3D model is reconstructed upon determining that at least a portion of the shell has a seamless body. In some other aspects, reconstruction of the 3D model can be conducted after the 3D model is sliced for printing. As will also be described, the 3D model is reconstructed upon determining that a slice of the model includes a single printable portion.

In accordance with embodiments described herein, FIG. 1 illustrates an exemplary 3D modeling application in which implementations of the present disclosure may be employed. In particular, FIG. 1 shows a high level view of an exemplary 3D modeling application 100. It should be understood that this and other arrangements described herein are set forth only as examples. Other arrangements and components (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In accordance with embodiments described herein, the 3D modeling application 100 is broadly configured to at least receive a 3D model for viewing, manipulation, and/or printing. A 3D model is a virtual design of an object of three dimensions. The virtual design is typically stored in a digital file, such as a Computer Aided Design (CAD) file, and used in conjunction with a 3D modeling application. The virtual design includes geometric data of an object, in three dimensions, representing a shape and appearance of a real object. Based on this virtual design, 3D printers can print an object that is a tangible embodiment of the 3D model.

Among other components not shown, the 3D modeling application 100 can include a 3D model slicing component 110, 3D model reconstructing component 120, and a 3D model handling component 130. The 3D model slicing component 120 can be configured to cut the 3D model into many cross-sections (herein also referred to as "slices") in preparation for 3D printing the object. The 3D model reconstructing component 120 can comprise a 3D model analyzing component 122 and a 3D model transforming component 124. As will be described herein, the 3D model analyzing component 122 can make determinations on whether the 3D model can be reconstructed in accordance with embodiments described herein. The 3D model transforming component 124 can be configured to modify the design of at least some printable portions of the 3D model to eliminate the necessity to print long lines typically associated with structural failures (e.g., bending, cracking) when 3D printing the object based on the 3D model. Finally, the 3D model handling component 130 can be configured to provide the 3D model or the reconstructed 3D model to another component of the system, such as, among other things, a 3D printer, a storage device, or a communication device.

Although illustrated as part of the 3D modeling application 100, it is contemplated that the 3D model slicing component 120 can be implemented in a separate application apart from the 3D modeling application 100. As one of ordinary skill in the art might appreciate, the 3D model slicing component 120 can be configured to prepare a 3D model (for instance, 3D model 200a of FIG. 2A) for printing by "slicing," or in other words cutting, the 3D model into many printable cross-sections or "slices" (as illustrated in sliced 3D model 200b of FIG. 2B). Each slice 200c of the 3D model, as illustrated in FIG. 2C, is a thin, horizontal cross-section of the virtual design of the object. The slices can be provided to a 3D printer in order to manufacture the object based on the 3D model. As was described, fused deposition modeling techniques incorporate an additive manufacturing process wherein successive layers are built on top of one another. As such, the FDM 3D printer receives each slice of the 3D model and prints successive slices of the object moving vertically upwards, starting from a bottom slice and finishing with a top slice, until printing of the object is completed. It is contemplated that any portion of the object that is printed requires an extrusion of thermoplastic material using a single unbroken pass of a 3D printer, and any empty space of the object is passed over without extrusion of the thermoplastic material.

In one embodiment, the 3D model analyzing component 110 can be configured to determine whether a structural characteristic of a 3D model is compatible for reconstruction by analyzing one or more slices of the 3D model and determining whether a structural characteristic is compatible for reconstruction. In more detail, the 3D model analyzing component 110 can be configured to receive one or more slices of the 3D model from the 3D model slicing component 120. Each slice can be analyzed by the 3D model analyzing component 110 to determine whether any single printable portion of the slice exceeds a threshold length. In some aspects, a threshold length can be a predetermined length that is configured by a user or administrator. In other words, a user may already have a general idea of a desirable threshold length and set a predetermined length as the threshold length. For instance, the user or administrator may already know that single printable portions exceeding ½ inch could lead to structural issues (e.g., cracking or bending). As such, the user or administrator could manually set the threshold length to be ½ inch, so that the 3D model analyzing component 110 could look for single printable portions exceeding ½ inch. In another instance, the user or administrator may simply want to set a threshold length (e.g., ⅓ inch) irrespective of a known length that could lead to structural issues. To this end, the user or administrator could manually set the threshold length to look for single printable portions exceeding this length.

In some other aspects, the threshold length can be a length based on a function of a cooling speed of the thermoplastic material. In this regard, the cooling speed of the thermoplastic material can be considered, among other things, for calculating a maximum desirable length for printing a line of the thermoplastic material without introducing any concern of bending or cracking. For instance, if a particular ABS plastic filament was known to cool from a liquid at the time of extrusion (e.g., printing) to a solid in 2 seconds, and it took the 3D printer head 2 seconds to print a 1 inch line, it could be determined that the printing of any single printable portion having a length greater than 1 inch would not be recommended. In such a case, the threshold length could be calculated as having a 1 inch maximum desirable length. Although these numbers are merely exemplary, it is contemplated that the type of thermoplastic material, the gauge of the material, size of the extrusion head, and printed design could all have an effect in the calculation of the threshold length. As is described, in this embodiment, an output generated by the 3D model analyzing component 110 is a determination that the structural characteristic of a 3D model is compatible for reconstruction, in association with a "sliced" 3D model.

In another embodiment, the 3D model analyzing component 110 can be configured to determine whether at least a portion of a 3D model comprises a seamless body. In more detail, the 3D model analyzing component 110 can be configured to analyze at least a shell of the 3D model, the shell defining the surface area or general shape of the 3D model or an object based on the 3D model. Analysis of the 3D model shell may include making a determination that at least a portion of the shell comprises at least one solid line (also referred to herein as a single printable portion) exceeding a threshold length, as described above. Such an analysis and determination may require an ad hoc slicing of at least a portion of the 3D model, although other methods of 3D model analysis are contemplated. For instance, the 3D model analyzing component 110 might analyze a cylindrical vase to determine whether at least a portion of the vase appears to be seamless (i.e., not including gaps or apertures). These portions may then be further analyzed to determine whether, when sliced, the portion comprises one or more solid lines exceeding the threshold length. In such an embodiment, the output generated by the 3D model analyzing component 110 is a determination that at least a portion of a 3D model shell comprises a seamless body, in association with an "unsliced" 3D model.

As described above, the 3D model analyzing component 122 can make determinations on whether the 3D model can be reconstructed in accordance with embodiments described herein. Based on the determination made by the 3D model analyzing component 122, the 3D model transforming component 124 can be configured to modify the design of at least some printable portions of the 3D model to eliminate the necessity to print long lines typically associated with structural failures (e.g., bending, cracking) when 3D printing the object based on the 3D model. As will be described, the 3D model transforming component 124 may be configured to generate a second 3D model based on a first 3D model, the first 3D model being an original 3D model provided to the 3D model analyzing component 122 prior to making a determination on whether the 3D model can be reconstructed in accordance with embodiments described herein. It is contemplated that generation of a second 3D model includes either the creation of an entirely new second 3D model that is separate from the first 3D model, or the second 3D model being a modification of the first 3D model.

In one embodiment, the 3D model transforming component 124 can be configured to generate a second 3D model based on the first 3D model. Based on a determination, made by 3D model analyzing component 122, that a structural characteristic of the first 3D model is compatible for reconstruction, a second 3D model can be generated. Turning now to FIG. 3A, and in accordance with an embodiment described herein, a first slice 300a of a first 3D model is illustrated having a single printable portion 310a that is located at a first location 320a, the single printable portion 310a being a printable portion exceeding a threshold length.

FIG. 3B illustrates a second slice 300b of a second 3D model, the second slice 300b corresponding to the first slice 300a of the first 3D model. The second slice 300b includes, instead of a single printable portion 310a, a plurality of independently printable portions 310b located at a second location 320b corresponding to the first location 320a, and each independently printable portion 310b being shorter than the single printable portion 310a. In some aspects, each of the independently printable portions 310b can be spaced apart, as is illustrated in FIG. 3B. For instance, each independently printable portion 310b can be space apart anywhere between 0.1 mm to 3 inches. It is of course contemplated that spacing between each independently printable portion is kept below a gap threshold to avoid support issues (i.e. sagging) when printing a successive layer above the preceding layer, as will be described herein.

FIG. 3C also illustrates a second slice 300c of a second 3D model, the second slice 300c corresponding to the first slice 300a of the first 3D model. The second slice 300c also includes, instead of a single printable portion 310a, a plurality of independently printable portions 310c located at a second location 320c corresponding to the first location 320a, and each independently printable portion 310c being shorter than the single printable portion 310a. In this aspect, each of the independently printable portions 310c is annular in shape. In the illustrated embodiment, the annular shape is circular. It is however contemplated that the annular shapes may be any shape (rectangle, ellipse, square, triangle, trapezoid, etc.). It is further contemplated that, when printed, each successive layer is substantially in line with the preceding layer to form a cylindrically shaped column.

As can be appreciated, both of FIGS. 3B and 3C represent a slice of a 3D model that is reconstructed in such a way that the printing of long lines, which is associated with cracking, bending, or decreased structural integrity of a 3D printed object based on the 3D model, is avoided. As such, a printed object based on a reconstructed second 3D model can avoid the problems related to the printing of long lines and also, in some cases, avoid the adding of material wasting support structures (e.g., lattices).

In another embodiment, the 3D model transforming component 124 can be configured to generate a second 3D model based on a first 3D model upon receiving a determination that at least a portion of an "unsliced" 3D model shell has a seamless body. Turning now to FIG. 4A, and in accordance with an embodiment described herein, a first 3D model 400a having a shell 410a is illustrated. As one of ordinary skill in the art can appreciate, the shell of a 3D model defines the interior and exterior walls of the 3D model. The first 3D model shell 410a has at least a portion 420a of the shell at a first location 430a comprising a seamless body 440a, the seamless body 440a comprising a plurality of printable solid lines as described herein above.

In one aspect, based on a determination made by the 3D model analyzing component 122 that at least a portion of the shell comprises a seamless body, the 3D model transforming component 124 can generate a second 3D model 400b that includes a reconstructed shell 410b, as illustrated in FIG. 4B. The reconstructed shell 410b can include, at a second location 430b corresponding to the first location 430a, a plurality of columnar structures 440a. The second 3D model 400b, including at least the plurality of columnar structures 440a, defines a reconstructed shape that is substantially similar to the shape of the first 3D model. It is contemplated that in order to convert a seamless body 440a into a plurality of columnar structures 440, a profile width presented by the plurality of columnar structures 440 may be at least twice the original width of the seamless body 440a.

In some embodiments, the plurality of columnar structures 440a can be disposed between a solid shell, or exterior and interior walls for defining a shell, similar to the 3D model shell of FIG. 4A. Although the inclusion of the solid shell would necessitate the printing of long, independently printable portions, the benefits derived from the plurality of columnar structures 440a disposed within the solid shell are still ascertainable as described herein.

The plurality of columnar structures 440a, when sliced, would operate to provide (for instance, the 3D model handling component 130) slices of the second 3D model comprising a plurality of independently printable portions, with each independently printable portion not exceeding a threshold length in accordance with embodiments described herein. A slice of the columnar structures 440a can be comparable to the reconstructed slice as illustrated in FIG. 3C. In this regard, it is contemplated that the columnar structures 440a may also be constructed using any shape in columnar form including circles, ellipses, trapezoids, triangles, and squares, among others.

In another aspect, based on a determination made by the 3D model analyzing component 122 that at least a portion of the shell comprises a seamless body, the 3D model transforming component 124 can generate a second 3D model 400c that includes a reconstructed shell 410c, as illustrated in FIG. 4C. In some aspects, the reconstructed shell 410c can include a plurality of offset apertures 420c. The offset apertures 420c are configured in an offset pattern, as illustrated, to facilitate printing of the reconstructed shell 410c using a plurality of disconnected or independently printed portions. In accordance with embodiments described herein, when the reconstructed shell 410c is sliced for printing, each slice would comprise a plurality of independently printable portions not exceeding a threshold length, which can be compared to the reconstructed slice 300b of FIG. 3B.

A user could employ the benefits to such a reconstruction in at least two ways. For example, such a reconstruction can be useful for improving structural integrity as well as providing desirable design reconfigurations, for instance, providing a mesh design, or maintaining an overall structure while reducing an overall mass of the 3D object. Mesh designs can be difficult to create while maintaining structural integrity of 3D objects. As such, using the reconstruction methods described herein, mesh designs can be created while improving structural integrity of the 3D object. Further, certain objects may have utility based on the overall shape, and not on the overall mass. For example, a structural support (i.e., a chair leg) is typically in solid form. However, using the reconstruction methods described herein, the structural support could be reconstructed in a manner that is stronger than before, while also comprising less mass than originally designed, thereby reducing the weight associated with the structural support.

The 3D model 400c of FIG. 4C comprises a plurality of offset apertures 420c being trapezoidal in shape. Trapezoidal apertures provide a particular benefit to the reconstructed shell 410c, not only for aesthetic reasons, but for avoiding problems that might be related to printable gaps. In more detail, printable gaps are printable portions in a 3D model that do not have a preceding support layer to print directly on for structural support. Referring to FIG. 4C, each trapezoidal aperture presents a top side 430c, a bottom side 440c that is parallel to the top side 430c, and non-parallel left and right sides. The top side 430c presents a printable gap 450c that the 3D printer must be able to print over, without concern of structural failure or sag. The printable gap 450c can have a length that is less than a threshold length. The threshold length can be predetermined or based on a function of a cooling speed of the thermoplastic material. To this end, the threshold length should not be exceeded to avoid sagging or structural failure when printing over the printable gap 450c.

Although the 3D model 400c of FIG. 4C includes a plurality of offset trapezoidal apertures, it is contemplated, however, that the offset apertures may be another shape having at least a top side presenting a printable gap that does not exceed a threshold length and/or introduce structural failure or sag. In a preferred embodiment, the aperture shape would not include angles being shallower than 45 degrees to avoid such sag. Alternative shapes may include, among other shapes, triangles, pentagons, hexagons, or vertically oriented rectangles.

Turning now to FIG. 5, a flow diagram is provided that illustrates a method 500 for reconstructing a first 3D model in accordance with embodiments described herein. Initially, at block 510, a structural characteristic is determined to be compatible for reconstruction. The structural characteristic is a single printable portion at a first location of a first slice of the first 3D model. At block 520, a second 3D model is generated based on the first 3D model. The second 3D model includes a second slice that corresponds to the first slice of the first 3D model. The second slice has, at a second location corresponding to the first location, a plurality of independently printable portions. Each independently printable portion is shorter than the single printable portion. At block 530, the second 3D model having the plurality of independently printable portions is provided for printing an object using the second 3D model.

Turning now to FIG. 6, a flow diagram is provided that illustrates a method 600 for reconstructing a first 3D model in accordance with embodiments described herein. Initially, at block 610, a first 3D model for an object having an original shell is received. The original shell defines an original shape of the object. At block 620, it is determined that at least a portion of the original shell at a first location comprises a seamless body. At block 630, a second 3D model is generated based on the first 3D model. The second 3D model includes a reconstructed shell comprising a plurality of columnar structures in a second location that corresponds to the first location. The reconstructed shell defines a reconstructed shape that is substantially similar to the original shape of the object. At block 640, the second 3D model having the reconstructed shell is provided for printing the object using the second 3D model.

In some embodiments described herein, a "3D model" can be used to refer to a constructed 3D model (i.e., a 3D model object in a CAD file), or as a set of design parameters that define a 3D model to be generated by, for instance, a 3D modeling application. In another example, a 3D model can be a set of design parameters including, for instance: (bottom shape=circle; profile shape=cylinder; top shape=circle; angle=90 degrees; height=10 cm; radius=2 cm), the set of design parameters for constructing the same cylinder from the aforementioned example. In these cases, "the first 3D model" is not required and the final 3D model could be constructed based only on the design parameters.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, reconstructing a 3D model to prevent cooling fractures and improving structural integrity when 3D printing an object based on a 3D model. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for reconstructing a first 3D model, the method comprising:
   receiving the first 3D model for an object having an original shell, the original shell defining an original shape of the object;
   determining that at least a portion of the original shell at a first location comprises a seamless body;
   generating a second 3D model based on the first 3D model, the second 3D model including a reconstructed shell including a plurality of columnar structures in a second location corresponding to the first location, the reconstructed shell defining a reconstructed shape that is substantially similar to the original shape of the object; and
   providing the second 3D model having the reconstructed shell for printing the object using the second 3D model.

2. The method of claim 1, wherein the seamless body comprises a plurality of solid lines.

3. The method of claim 1, wherein printing is performed using fused deposition modeling with a thermoplastic material, the fused deposition modeling printing the object by printing each of a plurality of slices of the object in progression.

4. The method of claim 3, wherein when printing the plurality of slices of the object, each of the plurality of columnar structures is printed independently.

5. The method of claim 3, wherein the at least a portion of the original shell in the first location has a first width and the reconstructed shell including the plurality of columnar structures in the second location corresponding to the first location has a second width that is at least twice the first width.

6. The method of claim 1, wherein the original shell presents a first base portion comprising a plurality of solid lines, and wherein the restructured shell presents a second base portion comprising a plurality of circles.

7. A computerized system for reconstructing a first 3D model, the system comprising:
   one or more processors;
   one or more computer storage media storing computer-usable instructions that, when used by the one or more processors, cause the one or more processors to:
   determine that a first 3D model having a shell portion is compatible for reconstruction, wherein the first 3D model is compatible for reconstruction when the shell portion comprises a seamless body;
   generate a second 3D model based on the first 3D model, wherein generating the second 3D model includes reconstructing the shell of the first 3D model to include a plurality of offset apertures, and wherein the plurality of offset apertures facilitates printing of the shell using a plurality of disconnected portions; and
   providing the second 3D model having the plurality of offset apertures for printing the object using the second 3D model.

8. The system of claim 7, wherein printing is performed using fused deposition modeling with a thermoplastic material, the fused deposition modeling printing the object by printing each of a plurality of slices of the object in progression.

9. The system of claim 7, wherein the seamless body comprises a plurality of solid lines.

10. The system of claim 7, wherein each of the plurality of offset apertures includes a top side having a printable gap length.

11. The system of claim 10, wherein the printable gap length is a structural gap distance that a 3D printer can print over without structural failure.

12. A non-transitory computer storage medium storing computer-useable instructions that, when used by one or more computing devices, cause the one or more computing devices to perform operations for reconstructing a first 3D model, the operations comprising:
   receiving the first 3D model for an object having an original shell, the original shell defining an original shape of the object;
   determining that at least a portion of the original shell at a first location comprises a seamless body;
   generating a second 3D model based on the first 3D model, the second 3D model including a reconstructed shell including a plurality of columnar structures in a second location corresponding to the first location, the reconstructed shell defining a reconstructed shape that is substantially similar to the original shape of the object; and
   providing the second 3D model having the reconstructed shell for printing the object using the second 3D model.

13. The medium of claim 12, wherein the seamless body comprises a plurality of solid lines.

14. The medium of claim 12, wherein printing is performed using fused deposition modeling.

15. The medium of claim 14, wherein printing utilizes a thermoplastic material.

16. The medium of claim 14, wherein when printing the plurality of slices of the object, each of the plurality of columnar structures is printed independently.

17. The medium of claim 14, wherein the at least a portion of the original shell in the first location has a first width and the reconstructed shell including the plurality of columnar structures in the second location corresponding to the first location has a second width that is at least twice the first width.

18. The medium of claim 12, wherein the original shell presents a first base portion comprising a plurality of solid lines, and wherein the restructured shell presents a second base portion comprising a plurality of circles.

19. The medium of claim 12, wherein each of the columnar structures comprises a plurality of independently printable portions.

20. The medium of claim 12, wherein each independently printable portion is annular in shape.

* * * * *